March 18, 1958     P. AUGUST     2,826,894

TWO-STROKE CYCLE INTERNAL COMBUSTION ENGINE

Filed Jan. 31, 1955     2 Sheets-Sheet 1

INVENTOR.
PABLO AUGUST

BY *Toulmin & Toulmin*

ATTORNEYS

March 18, 1958 P. AUGUST 2,826,894
TWO-STROKE CYCLE INTERNAL COMBUSTION ENGINE
Filed Jan. 31, 1955 2 Sheets-Sheet 2
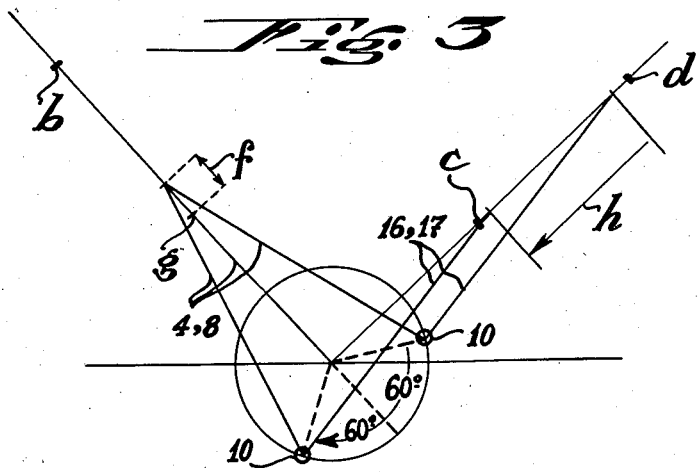
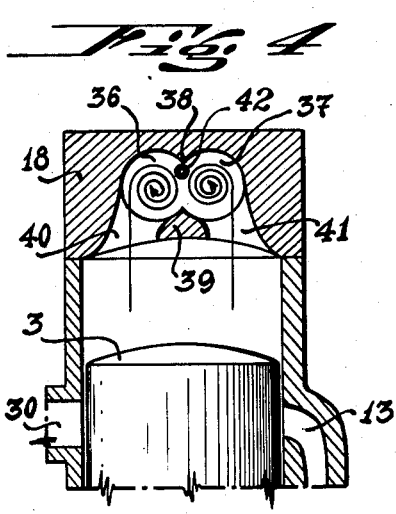
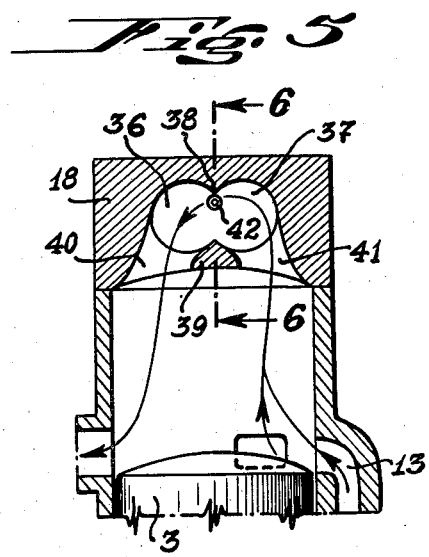
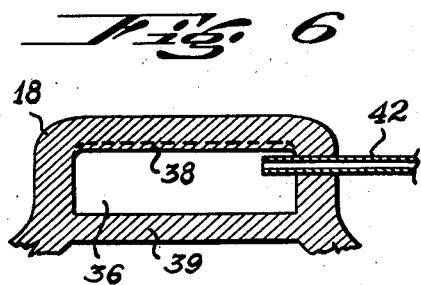
INVENTOR.
PABLO AUGUST
BY
ATTORNEYS

United States Patent Office 2,826,894
Patented Mar. 18, 1958

2,826,894

TWO-STROKE CYCLE INTERNAL COMBUSTION ENGINE

Pablo August, Buenos Aires, Argentina

Application January 31, 1955, Serial No. 485,068

4 Claims. (Cl. 60—14)

My present invention refers to certain new and useful improvements in two-stroke cycle internal combustion engines and more particularly in such engines with fuel injection.

An essential disadvantage of the usual two-stroke cycle internal combustion engines consists in a relatively low degree of air-charging. However, the construction of said two-stroke cycle internal combustion engines wherein the supply of the combustion air is effected by way of the crank-case, is so advantageously simple that it is used despite said disadvantage.

If, on the other hand, attempts would be made to increase the power of the engine by means of an increased charge of air, the pistons would be subject to undue thermal conditions.

Another disadvantage of the usual two-stroke cycle internal combustion engines consists in relatively high fuel losses during scavenging as well as in their low efficiency as compared with that of the four-stroke cycle internal combustion engines.

The main object of my present invention is to provide an improved two-stroke cycle internal combustion engine and more particularly of an improved two-stroke cycle engine with fuel injection, wherein not only the degree of air-charging, but also the efficiency and power of the engine are advantageously increased.

One important object of my invention is to provide an improved two-stroke cycle internal combustion engine, wherein the volume of the crank-case is considerably increased by the volume of an additional air-charging cylinder and wherein the piston of said additional cylinder is operatively connected with the piston of the working cylinder so that not only the volume of the charged air is increased, but also the efficiency of air-charging is improved.

Another important object of the invention is to provide an improved two-stroke cycle internal combustion engine, wherein a piston arranged in an additional air-charging cylinder, the interior of which is in direct communication with the crank-case, is operatively connected with the piston of the working cylinder and is so arranged that, on the one hand, the volume of the crank-case is considerably increased during all the time at which the air-inlet slots of the engine are opened by the working piston and that, on the other hand, the piston of the said additional cylinder performs an air injection under pressure into the working cylinder and ensures the desired unsymmetric distribution of the combustion air into the crank-case and therefrom into the working cylinder.

Whereas in the normal two-stroke cycle internal combustion engines, wherein the combustion air is supplied by way of the crank-case, the operation of sucking air into the crank-case ceases at the lower dead centre of the working piston, according to my present invention, the piston of the said additional cylinder continues moving so as to increase the volume of the crank-case and to suck air into the latter until the air-inlet slots of the engine are entirely or completely closed. By virtue of this arrangement according to the invention, the fact is that as long as the air-inlet slots are open, entirely or in part, the volume of the crank-case is increased and a larger quantity of air is available for charging the working cylinder.

In connection herewith, according to an additional feature of my invention, the flow conditions of the combustion air while passing from the crank-case into the upper portion of the working cylinder are considerably improved. Whereas normally the working piston already at its lower dead centre acts with the greatest pressure upon the air in the crank-case, the arrangement as provided by my invention is such that during all the time in which the air-passage from the crank-case to the working cylinder is open, the piston of the said additional air-charging cylinder moves from approximately its upper to its lower dead centre and additionally presses the air from the crank-case into the working cylinder.

Another object of my invention is to provide an improved two-stroke cycle internal combustion engine, wherein two working cylinders are arranged opposite each other having their working pistons connected to a common crankshaft and simultaneously operated, i. e. with simultaneous working and return strokes, and wherein one additional air-charging cylinder is provided for increasing the volume of the crank-case and for improving the supply of combustion air to the two working cylinders, with the advantageous result that the engine is mechanically perfectly balanced.

Still another object of my present invention is to provide an improved two-stroke cycle internal combustion engine, wherein the said additional air-charging cylinder is connected by valve-controlled pipes with the cooling system of the working cylinders and their cylinder heads, with the advantageous result that water vapour or heated air taken from said cooling system is caused to produce useful work and furnish at least the energy required for operating the piston in said additional cylinder.

In combination herewith, according to a further development of the invention, the said additional cylinder may be additionally connected by means of a valve-controlled pipe with a condenser which in turn by way of a pump is connected with the cooling system of the working cylinders, with the advantageous result that the water vapour after acting upon the piston in said additional cylinder is condensed and returned to said cooling system.

An additional object of my invention is to provide an improved two-stroke cycle internal combustion engine with fuel injection, wherein the cylinder head of each working cylinder is provided with a mixing combustion chamber formed by a pair of adjacent substantially cylindrical cavities into which the fuel is injected by any known means into said chamber between said two cavities, said cavities being in direct communication with the working cylinder and so constructed that, on the one hand, during the compression stroke of the working cylinder the fuel is efficiently evaporated and perfectly mixed with air and that, on the other hand, during the working stroke of said cylinder a perfect scavenging of the combustion chamber is ensured, the cooling system of the engine being so arranged that a substantial part of the cylinder remains uncooled.

Another object of the invention is to provide an improved two-stroke cycle fuel-injection internal combustion engine, wherein the cylinder head of each working cylinder comprises a heat-insulated mixing chamber formed by a pair of adjacent substantially cylindrical cavities communicated with each other and with the working cylinder, the fuel-injector being arranged so as to inject the fuel between said two cavities and the construction of these cavities being such that by virtue of a centrifugal effect to which fuel and air are subject in said cavities and by virtue of the heat-insulated walls of the latter, not only a perfect mixing of air and fuel is perfomed, but also an evaporation of the fuel is ensured with the advantageous results that mixing is performed within a shorter time, that retarded ignition is avoided, and that the combustion is uniform and complete.

In connection with this evaporation feature it may be stated that by virtue thereof the hard knocking of the known Diesel engines is avoided, the fuel-air mixture may be adjusted at a lower air proportion, a higher output per unit of fuel is ensured and the engine is rendered more insensible with regard to the fuel employed, so that it may be operated with any fuel of the range of from kerosene to fuel-oil.

With these objects and advantageous features in view, the present invention comprises the arrangement, combination and construction of parts as will be hereinafter fully described with reference to the accompanying drawings, whereon Figure 1 is a schematic longitudinal sectional view of the improved two-stroke cycle internal combustion engine according to the invention;

Figures 2 and 3 schematically illustrate the cooperation of a working piston with the piston of the additional air-charging cylinder while sucking air into the crank-case and while pressing the air from the crank-case into the working cylinder, respectively;

Figures 4 and 5 are enlarged sectional views of the upper end of a working cylinder and its cylinder head with an improved combustion chamber, illustrating the mixing process and the scavenging process, respectively, as carried out in said chamber;

Figure 6 is an enlarged sectional detail view taken along the line 6—6 of Figure 5, schematically showing the arrangement of the fuel-injecting means;

Figure 1:
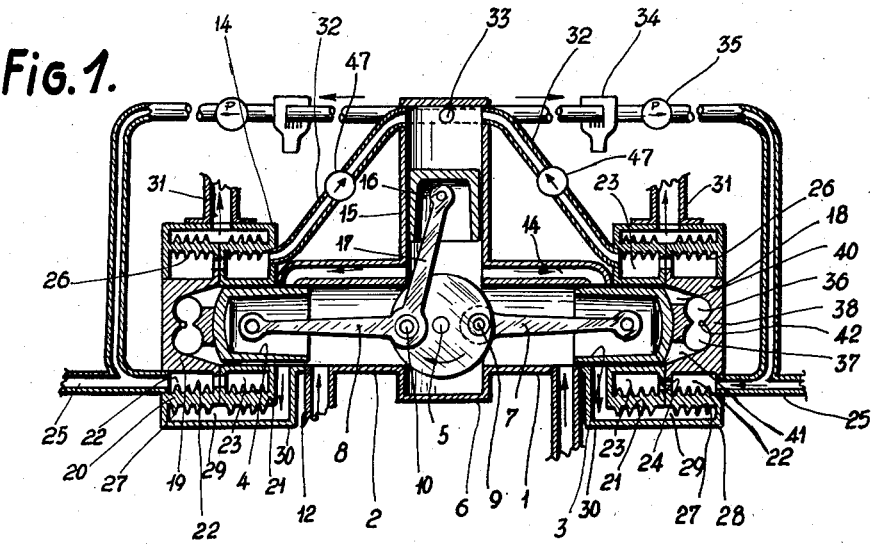

Having reference to the accompanying drawings, the improved two-stroke cycle internal combustion engine according to the present invention, in its embodiment as illustrated, comprises two horizontally arranged opposite working cylinders 1 and 2. The working pistons 3 and 4 are simultaneously operated i. e. with simultaneous working and return strokes and are connected to a common crankshaft 5 arranged in the crank-case 6. The reference numerals 7, 8 indicate the piston rods and 9, 10 the crank pins.

Each working cylinder 1, 2 is provided with an air-intake opening 11, 12 and comprises an air passage 13, 14 for supplying the combustion air from the interior of the crank-case 6 to the combustion space of each working cylinders.

Above the crank-case 6 which interconnects the two working cylinders 1, 2 there is provided an additional air-charging cylinder 15 with a piston 16 the rod 17 of which is connected with the crankshaft 5 and rotatively mounted on the crank pin 9 or 10, thus being operatively connected with one or another of the working pistons 3, 4. This connection is so arranged that the additional piston 16 lags for about 60° to 120°, preferably about 90°, with regard to the movements of the working pistons 3, 4.

The interior of the additional cylinder 15 considerably increases the volume of the crank-case 6 so that as will be readily appreciated a substantially larger quantity of air may be sucked into the latter by way of the air-intake openings 11, 12.

Figure 2:
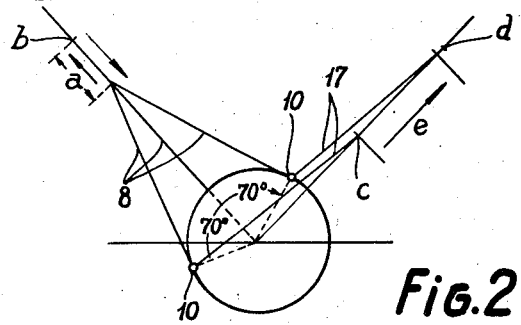

The effect of the additional piston 16 during the steps of sucking the air into the crank-case 6 and of pressing the air into the combustion spaces of the working cylinders 1, 2 has been clearly shown in Figures 2 and 3, respectively.

As will be seen from Figure 2, the air-sucking operation of the working piston 4, 8 is performed while the same moves over a certain distance $a$ prior to its reaching the upper dead centre $b$ and over a like distance after leaving its upper dead centre, said distance being equal to about 70° of the rotation of the crank pin 10 to which said working piston is secured. During the time the piston 4, 8 makes the afore-mentioned movements and maintains the air-intake 12 open, the piston 16, 17 of the additional cylinder moves from approximately its lower dead centre $c$ to its upper dead centre $d$ over a distance $e$ and during this movement i. e. as long as the air-intake is maintained entirely or partially open, additional air is sucked into the crank-case and into the additional cylinder 15 below the piston 16 so that not only the volume of the crank-case is increased, but that also a substantially increased quantity of air is available for the subsequent charging of the working cylinders.

This charging operation is illustrated in Figure 3. This operation is effected while the working piston 4, 8 moves over certain distance $f$ prior to its reaching its lower dead centre $g$ and over a like distance after leaving the lower dead centre, said distance being equal about 60° of the rotation of the crank pin 10, i. e. while the working piston maintains the air passage 14 open or partly open. During this movement of the working piston 4, 8, the piston 16, 17 of the additional cylinder 2 (Fig. 1) moves from approximately its upper dead centre $d$ to nearly its lower dead centre $c$ as indicated by the arrow $h$, during which movement the additional piston 16 (Fig. 1) efficiently presses the air from the crank-case 6 by way of the passages 13, 14 into the combustion spaces of the working cylinders 1, 2 and ensures a good air-charging of the latter.

Referring again to Figure 1, the working cylinders 1, 2 and the respective cylinder heads 18, 19 are provided each with a cooling system. This cooling system comprises a composite jacket 20, 21 covering the outer end portion of said cylinder and the cylinder head 18, respectively, and forming two ring chambers 22, 23 which are intercommunicated at 24 and of which the chamber 22 is provided with an inlet port 25 for the cooling medium, water or air. The jacket 20, 21 is provided with inner and outer ribs 26, 27 and is surrounded by an outer jacket 28 forming a ring chamber 29 which is connected, on the one hand, with the exhaust port 30 of the working cylinder 1 and, on the other hand, with the exhaust pipe 31, the arrangement being such that while the cooling medium passes through the ring chambers 22, 23 and cools the cylinder head 18 and the outer end portion of the same, the outer fins 27 are being heated by the exhaust gases, being expelled by the piston 3 through the aforesaid exhaust ports 30.

The chamber 23 is connected by a pipe 32 with the upper end portion of the additional cylinder 15, said cylinder being provided with known valve means (not shown) such as used in steam engines for controlling the steam inlet and outlet, for introducing steam under pressure into the cylinder 15 above the piston 16 and cause the latter to produce useful work, to move downwards and inject the air from the crank-case into the working cylinders. If desired, the exhaust port 33 of the cylinder 15 may be connected by way of a condenser 34 and a pump 35 with the inlet port 25 of the cooling system for re-use of the cooling medium.

The operation of the engine as above described is as follows:

The working pistons 3 and 4 are shown at their upper dead points, closing the exhaust ports 30, 30 and the outlet ends of the air passages 13, 14, while the air intake ports 11, 12 are open. The piston 16 of the additional cylinder 15 which is operatively connected with the piston rods 7, 8 occupies a position intermediate its upper and lower dead points as shown in Figure 1. By the explosion of the fuel-air charges in the combustion chambers of the working cylinders 1 and 3, both working pistons 3 and 4 are moved towards the crankshaft 5, the additional piston 16 moves to its upper dead point and while the intake ports 11, 12 are not entirely closed by the working pistons 3, 4 outward movement of 16 sucks air into the crank-case 6 and into the additional cylinder 15. At their lower dead points the working pistons 3, 4 open not only the exhaust ports 30, 30 but also the outlet ends of the air passages 13, 14. During their return strokes the working pistons 3, 4 after scavenging the combustion chambers of the working cylinders 1, 2 close the exhaust ports 30, 30. At the same time the additional piston 16 moves from its upper dead point towards its lower dead point pressing the air previously drawn into the crank-case 6 and the additional cylinder 15 by way of the air passages 13, 14 as long as their outlet ends are maintained open by the working pistons 3, 4, thereby efficiently charging the working cylinders 1, 2 with combustion air as has been clearly explained with reference to Figures 3 and 4.

This working or air-charging stroke of the additional piston 16, according to the invention, occurs under the influence of a power medium derived from the cooling systems of the working cylinders 1, 2. The hot exhaust gases pass from the exhaust ports 30, 30 through the chambers 29 and escape by way of the exhaust pipe 31. The cooling medium entering by way of the pipe 25, while passing through a first chamber formed by the inner jacket 20, cools the cylinder heads 18, 19 and is heated after passing through the annular passage 24 into the ring chamber 23 by the hot exhaust gases. The vaporized or overheated cooling medium, by way of the pipes 32 and suitable known valves 47, enters the cylinder 15 and acts upon the piston 16 urging the latter towards its lower dead point. When this piston 16 moves upwards, said valves are closed and the cooling medium leaves the cylinder by way of the exhaust port 33 which is also controlled by a known valve in a known manner and, if desired, may be connected by way of a condenser 34 and a pump 35 with the inlet port or pipe 25. Thus it will be understood that the cooling systems in combination with the additional cylinder 15 and its piston 16 operates as a steam engine.

The cylinder heads 18, 19 of the working cylinders 1, 2 are not cooled at their outer end surfaces. Each cylinder head comprises a mixing combustion chamber formed by two adjacent substantially cylindrical cavities 36, 37. The two cavities are intercommunicated by an opening formed between an upper rib 38 and a lower cross piece 39 which at the same time separates from each other the passages 40, 41 which communicate said cavities with the interior of the working cylinder 1 or 2. The reference numeral 42 schematically indicates a fuel-injection nozzle so arranged that the fuel is injected longitudinally into the opening between the two cylindrical cavities 36, 37 and is taken up by the air currents introduced into said cavities by the working piston. In these cavities the injected fuel is thoroughly mixed, as illustrated in Figure 4, with the air of the working cylinder which due to the cylindrical shape of said cavities under the pressure exerted by the working piston is caused to rotate, to bring the fuel into contact with the hot walls of said cavities, to perfectly vaporize the fuel and to become efficiently mixed with the fuel vapour, so that a uniform and complete combustion is ensured. Further, as shown in Figure 5, the combustion chamber formed by the two cylindrical cavities permits a very efficient scavenging operation.

Figure 7:
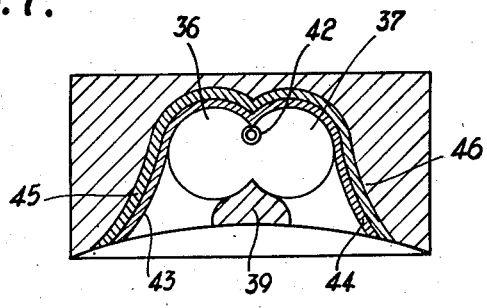
Figure 7 is a sectional view similar to Figure 4 showing the combustion chamber adapted for use in a Diesel engine incorporating the improvements according to this invention.

Figure 7 shows the combustion chamber according to Figures 4, 5 and 6, particularly adapted for being used in a diesel engine, wherein the two cylindrical cavities 36, 37 are formed by shell bodies 43, 44 of heat resisting material which are heat-insulated as by interposed layers or free air spaces 45, 46. The air which circulates in the combustion chamber 36, 37 absorbs heat from the shell bodies 43, 44 and is heated to a temperature so high that the fuel particles taken up thereby and moved over the hot shell surfaces are immediately evaporated. This leads to a practically instantaneous evaporation of the fuel, the resulting fuel vapors are thoroughly mixed with the air, combustion of the fuel is uniform and complete, and a retarded ignition is avoided.

It is obvious that the present invention is by no means restricted to the embodiment as described and shown, but that alterations and modifications as to details of arrangement and construction may be made therein, and that such alterations and modifications are to be considered as falling within the scope of the invention as clearly outlined in the appended claims.

What I claim as new and desire to secure by Letters Patent is:

1. Two-stroke cycle internal combustion engine, comprising at least one working cylinder having a cooling system therefor and a crank-case in direct communication with said cylinder, air intake ports in said cylinder in direct communication with the interior of said crank-case to provide an air intake chamber, a working piston in said cylinder connected by its piston rod to a crank pin of a crankshaft in said crank-case, a secondary cylinder secured to said crank-case and also in direct communication with the latter for increasing the capacity of said air intake chamber, an air passage extending along the wall of said working cylinder and connecting said air intake chamber with the interior of said working cylinder at a point near a composite combustion chamber formed by two adjacent cylindrical cavities communicating with each other and with the interior of said working cylinder, an air-charging piston in said secondary cylinder connected by its rod with the crank pin of the said crank shaft and so connected that it lags in its movements for about 60° to 120° with regard to the movements of said working piston, inlet and outlet means provided at the closed free end of said secondary cylinder for the admittance and exhaust, respectively, of a power medium derived from a cooling medium used in said cooling system of the internal combustion engine for causing said air-charging piston to operate as an independent secondary piston engine and to effect an asymmetric charging of said working cylinder with air in excess and a good scavenging operation, a pipe connection between said inlet means and the said cooling system of said working cylinder including conduit means for the exhaust gases of said working cylinder for heating the cooling medium used in said cooling system and thus providing the power medium for said secondary piston engine.

2. Two-stroke cycle internal combustion engine, comprising at least one pair of opposite working cylinders each having a cooling system therefor and a common crank-case interconnecting said pair of cylinders and in direct communication with both of them, air intake ports in each cylinder in direct communication with the interior of said crank-case to provide a common air intake chamber, a working piston in each of said cylinders connected by its piston rod to an individual crank pin of a common crankshaft in said crank-case, a secondary cylinder secured to said crank-case and also in direct communication with the latter for increasing the capacity of said air intake chamber, an air passage extending along the wall of each of said working cylinders and connecting said air intake chamber with the interior of said working cylinders at a point near a composite combustion chamber of each working cylinder, each combustion chamber being formed by two adjacent cylindrical cavities communicating with each other and with the interior of the respective working cylinder, an air-charging piston in said secondary cylinder connected by its rod with one of the said crank pins of said common crankshaft and so arranged that it lags in its movements for about 90° with regard to the symmetrical movements of said working pistons, inlet and outlet means provided at the closed free end of said secondary cylinder for the admittance and exhaust, respectively, of a power medium derived from a cooling medium used in said cooling system of the internal combustion engine for causing said air-charging piston to operate as an independent piston engine and to effect an asymmetric charging of said working cylinders with air in excess and a good scavenging operation, pipe connections between said inlet means and the said cooling systems of said working cylinders and including conduit means for the exhaust gases of said working cylinders for heating the cooling medium and thus providing said power medium for said secondary piston engine.

3. Two-stroke cycle internal combustion engine according to claim 1, wherein the said cooling system of the working cylinder comprises a double jacket around the outer end portion of said working cylinder and its cylinder head to form an inner annular chamber for the passage of a cooling medium and an outer annular chamber for the passage of the exhaust gases of said working cylinder, said inner annular chamber having an inlet port for the cooling medium of an outlet port connected with the said inlet means of the said secondary cylinder, and wherein the said outlet means of the latter is connected by a return pipe to the inlet port of said inner annular chamber of said cooling system.

4. Two-stroke cycle internal combustion engine according to claim 2, wherein the said cooling system of each of the said working cylinders comprises a double jacket around the outer end portion of said working cylinder and its cylinder head to provide an inner annular chamber for the passage of a cooling medium and an outer annular chamber for the passage of the exhaust gases of said working cylinder, said inner annular chamber having an inlet port for the cooling medium and an outlet port connected with the said inlet means of the said secondary cylinder, and wherein the said outlet means of the latter is connected by a return pipe to the inlet port of said inner annular chamber of said cooling system.

References Cited in the file of this patent

UNITED STATES PATENTS

| | | |
|---|---|---|
| 1,042,975 | Sailer | Oct. 29, 1912 |
| 1,301,614 | Snyder | Apr. 22, 1919 |
| 1,978,335 | Augustine | Oct. 23, 1934 |

FOREIGN PATENTS

| | | |
|---|---|---|
| 510,522 | Germany | Oct. 20, 1930 |
| 22,382 | Finland | Apr. 15, 1948 |